United States Patent
Keatch

(10) Patent No.: US 7,470,330 B2
(45) Date of Patent: Dec. 30, 2008

(54) METHOD FOR DISSOLVING OILFIELD SCALE

(75) Inventor: Richard Keatch, Aberdeenshire (GB)

(73) Assignees: M-1 Production Chemicals UK Limited, Aberdeen (GB); Oilfield Mineral Solutions Limited, Edinburgh (GB)

( * ) Notice: Subject to any disclaimer, the term of this patent is extended or adjusted under 35 U.S.C. 154(b) by 0 days.

(21) Appl. No.: 11/690,660

(22) Filed: Mar. 23, 2007

(65) Prior Publication Data

US 2007/0221246 A1  Sep. 27, 2007

Related U.S. Application Data

(60) Provisional application No. 60/785,045, filed on Mar. 23, 2006.

(51) Int. Cl.
    *B08B 3/04*  (2006.01)
(52) U.S. Cl. ............. 134/26; 588/20; 588/315; 166/312; 507/239; 210/698; 210/711; 210/714; 134/2; 134/3; 134/28; 134/29; 134/34; 134/36; 134/41; 134/42
(58) Field of Classification Search ......... 588/20, 588/315; 166/312; 507/239; 134/2, 3, 26, 134/28, 29, 34, 36, 41, 42; 210/698, 711, 210/714
    See application file for complete search history.

(56) References Cited

U.S. PATENT DOCUMENTS

| 3,033,214 | A | * | 5/1962 | Bersworth et al. ............. 134/13 |
| 3,625,761 | A | * | 12/1971 | Tate ............................... 134/3 |
| 3,873,362 | A | * | 3/1975 | Mihram et al. .................. 134/3 |
| 3,925,827 | A | | 12/1975 | Wagenhals |
| 4,030,548 | A | | 6/1977 | Richardson et al. |
| 4,147,647 | A | | 4/1979 | Rybacki |
| 4,485,874 | A | | 12/1984 | Meyers |
| 4,495,996 | A | | 1/1985 | Meyers et al. |
| 4,973,201 | A | | 11/1990 | Paul et al. |
| 4,980,077 | A | | 12/1990 | Morris et al. |
| 5,049,297 | A | | 9/1991 | Morris et al. |
| 5,068,042 | A | | 11/1991 | Hen |

(Continued)

FOREIGN PATENT DOCUMENTS

GB  2314865  1/1998

OTHER PUBLICATIONS

International Search Report issued in International Application No. PCT/US2007/064823 dated Jul. 16, 2007 (2 pages).

(Continued)

*Primary Examiner*—Sharidan Carrillo
(74) *Attorney, Agent, or Firm*—Osha - Liang LLP

(57) ABSTRACT

A method of removing metal scale from surfaces that includes contacting the surfaces with a first aqueous solution of a chelating agent, allowing the chelating agent to dissolve the metal scale, acidifying the solution to form a precipitant of the chelating agent and a precipitant of the metal from the metal scale, isolating the precipitant of the chelating agent and the precipitant of the metal from the first solution, selectively dissolving the precipitated chelating agent in a second aqueous solution, and removing the precipitated metal from the second solution is disclosed.

21 Claims, 1 Drawing Sheet

U.S. PATENT DOCUMENTS

| | | | |
|---|---|---|---|
| 5,084,105 A | | 1/1992 | Morris et al. |
| 5,087,371 A | * | 2/1992 | Morris et al. ............... 210/643 |
| 5,151,196 A | * | 9/1992 | Paul et al. ................... 210/712 |
| 5,200,117 A | | 4/1993 | Morris et al. |
| 5,225,087 A | * | 7/1993 | Kardos ....................... 210/713 |
| 5,234,602 A | | 8/1993 | Morris et al. |
| 5,259,980 A | | 11/1993 | Morris et al. |
| 5,322,644 A | * | 6/1994 | Dunn et al. .................... 588/7 |
| 5,550,313 A | * | 8/1996 | Hayden ....................... 588/256 |
| 5,685,918 A | | 11/1997 | Tate |
| 2002/0192145 A1 | * | 12/2002 | Oldfield ....................... 423/555 |

OTHER PUBLICATIONS

PCT Written Opinion issued in International Application No. PCT/US2007/064823 dated Jul. 16, 2007 (5 pages).

* cited by examiner

US 7,470,330 B2

METHOD FOR DISSOLVING OILFIELD SCALE

CROSS-REFERENCE TO RELATED APPLICATIONS

This application claims priority, pursuant to 35 U.S.C. § 119(e), to U.S. Patent Application Ser. No. 60/785,045, filed on Mar. 23, 2006, which is herein incorporated by reference in its entirety.

BACKGROUND OF INVENTION

1. Field of the Invention

The invention relates generally to a method for removing metal or mineral deposits from surfaces, in particular, from surfaces of drilling machinery in the oil industry.

2. Background Art

Subterranean oil recovery operations may involve the injection of an aqueous solution into the oil formation to help move the oil through the formation and to maintain the pressure in the reservoir as fluids are being removed. The injected water, either surface water (lake or river) or seawater (for operations offshore) generally contains soluble salts such as sulfates and carbonates. These salts may be incompatible with the ions already contained in the oil-containing reservoir. The reservoir fluids may contain high concentrations of certain ions that are encountered at much lower levels in normal surface water, such as strontium, barium, zinc and calcium. Partially soluble inorganic salts, such as barium sulfate (or barite) and calcium carbonate, often precipitate from the production water as conditions affecting solubility, such as temperature and pressure, change within the producing well bores and topsides. This is especially prevalent when incompatible waters are encountered such as formation water, seawater, or produced water.

Some mineral scales have the potential to contain naturally occurring radioactive material (NORM). The primary radionuclides contaminating oilfield equipment include Radium-226 ($^{226}$Ra) and Radium-228 ($^{228}$Ra), which are formed from the radioactive decay of Uranium-238 ($^{238}$U) and Thorium-232 ($^{232}$Th). While $^{238}$U and $^{232}$Th are found in many underground formations, they are not very soluble in the reservoir fluid. However, the daughter products, $^{226}$Ra and $^{228}$Ra, are soluble and can migrate as ions into the reservoir fluids to eventually contact the injected water. While these radionuclides do not precipitate directly, they are generally co-precipitated in barium sulfate scale, causing the scale to be mildly radioactive.

Because barium and strontium sulfates are often co-precipitated with radium sulfate to make the scale mildly radioactive, handling difficulties are also encountered in any attempts to remove the scale from the equipment. Unlike common calcium salts, which have inverse solubility, barium sulfate solubility, as well as strontium sulfate solubility, is lowest at low temperatures, and this is particularly problematic in processing in which the temperature of the fluids decreases. Modern extraction techniques often result in drops in the temperature of the produced fluids (water, oil and gas mixtures/emulsions) (as low as by 5° C.) and fluids being contained in production tubing for long periods of time (24 hrs or longer), leading to increased levels of scale formation. Because barium sulfate and strontium sulfate form very hard, very insoluble scales that are difficult to prevent, dissolution of sulfate scales is difficult (requiring high pH, long contact times, heat and circulation) and can only be performed topside.

When pipes and equipment used in oilfield operations become layered with scale, the encrustation must be removed in a time- and cost-efficient manner. Occasionally, contaminated tubing and equipment is simply removed and replaced with new equipment. When the old equipment is contaminated with NORM, this scale encrusted equipment cannot be disposed of easily because of the radioactive nature of the waste. The dissolution of NORM scale and its disposal can be a costly and hazardous affair. At present, a considerable amount of oilfield tubular goods and other equipment awaiting decontamination is sitting in storage facilities. Some equipment, once cleaned, can be reused, while other equipment must be disposed of as scrap. Once removed from the equipment, several options for the disposal of NORM exist, including canister disposal during well abandonment, deep well injection, landfill disposal, and salt cavern injection.

Typical equipment decontamination processes have included both chemical and mechanical efforts, such as milling, high pressure water jetting, sand blasting, cryogenic immersion, and chemical chelants and solvents. Water jetting using pressures in excess of 140 MPa (with and without abrasives) has been the predominant technique used for NORM removal. However, use of high pressure water jetting generally requires that each pipe or piece of equipment be treated individually with significant levels of manual intervention, which is both time consuming and expensive, but sometimes also fails to thoroughly treat the contaminated area. When scale includes NORM, this technique also poses increased exposure risks to workers and the environment.

While chemical chelants, such as EDTA (ethylenediaminetetraacetic acid) or DTPA (diethylenetriaminepentaacetic acid), have long been used to remove scale from oil field equipment, once EDTA becomes saturated with scale metal cations, the spent solvent is generally disposed of, such as by re-injection into the subsurface formation. However, because the process requires that disposal of the solvents once saturated, the large amounts of a fairly expensive solvent necessary for decontamination renders the process economically prohibitive.

U.S. Pat. No. 5,234,602 discusses a process whereby the chelating agent is regenerated in solution throughout the decontamination cycle. The '602 patent teaches that by lowering the pH of the solution to a pH of 4-9, preferably 5-7, following the sequestration of barium by DTPA, the chelated barium ions may be displaced from the chelating agent and precipitated as an insoluble barium salt, such as barium sulfate. Once the precipitant has formed and has been removed from the DTPA solution, the DTPA solution may be reused to dissolve additional scale. FIGS. 1-2 of the '602 patent show that while the cumulative amount of barium sulfate removed from a tubular can be increased using the regenerated DTPA, the amount removed per cycle actually decreases. The observed decrease in productivity of the DTPA solution may result from increased levels of impurities, i.e., insoluble salts formed from the other mineral deposits on the equipment or the successive addition of the acid and base, in the solution with each successive cycle and/or a reduction in the concentration of the chelating agent as more water is formed during the regeneration cycle.

Accordingly, there exists a need for an economically efficient means for removing scale from oilfield equipment with a low risk of exposure to radioactive materials.

SUMMARY OF INVENTION

In one aspect, embodiments disclosed herein relate to a method of removing metal scale from surfaces that includes contacting the surfaces with a first aqueous solution of a chelating agent, allowing the chelating agent to dissolve the metal scale, acidifying the solution to form a precipitant of the chelating agent and a precipitant of the metal from the metal scale, isolating the precipitant of the chelating agent and the precipitant of the metal from the first solution, selectively dissolving the precipitated chelating agent in a second aqueous solution, and removing the precipitated metal from the second solution.

In another aspect, embodiments disclosed herein relate to a method of removing scale from surfaces, that includes contacting the surfaces with a first aqueous solution of EDTA and potassium carbonate, allowing the EDTA to dissolve the scale, where the scale comprise at least one of barium sulfate, strontium sulfate, and radium sulfate, acidifying the first solution to form a precipitant of EDTA and precipitant of an insoluble salt of at least one of barium, strontium, and radium, isolating the precipitated EDTA and the precipitated insoluble salt of the at least one of barium, strontium, and radium from the first solution, selectively dissolving the precipitated EDTA in a second aqueous solution, and removing the precipitated insoluble salt of at least one of barium, strontium, and radium from the second solution.

Other aspects and advantages of the invention will be apparent from the following description and the appended claims.

DETAILED DESCRIPTION

Figure 1:
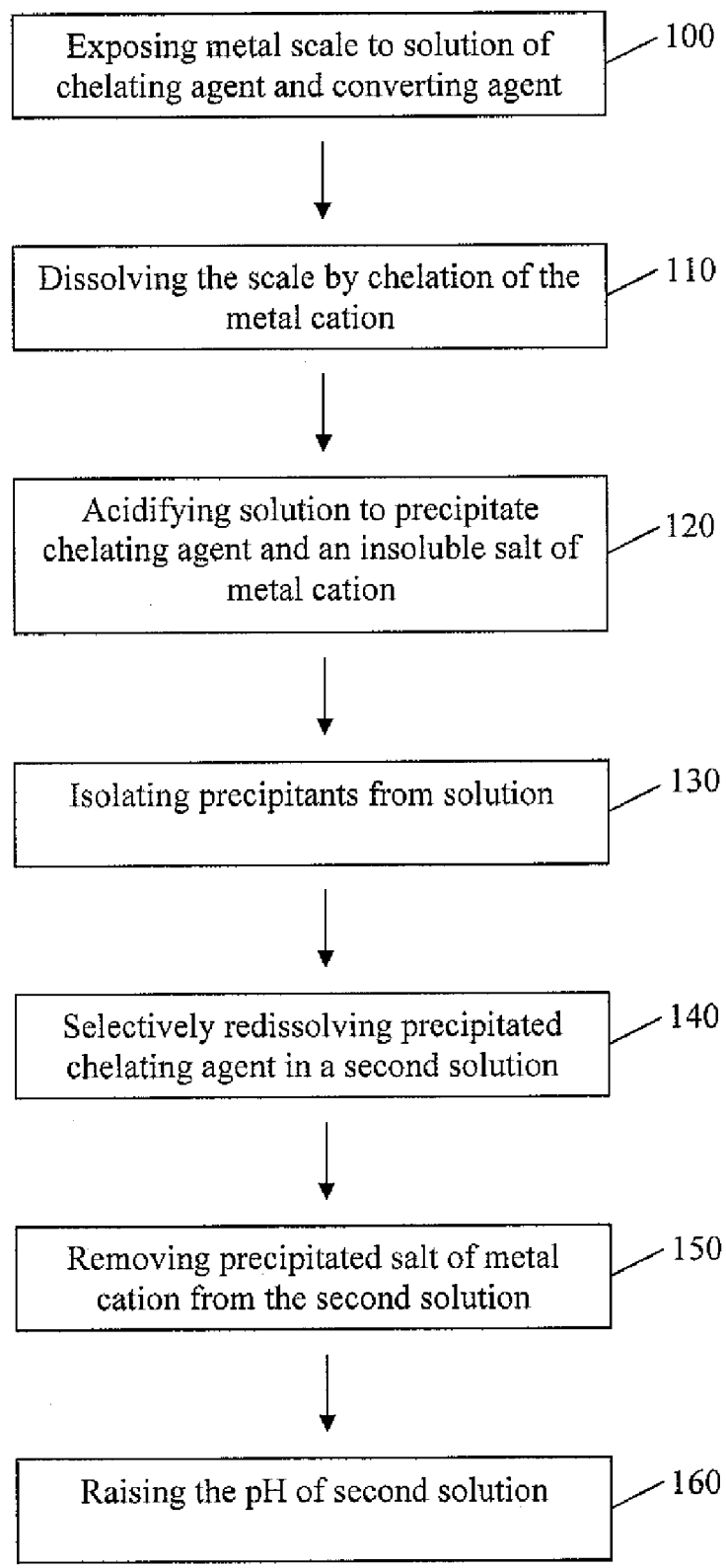
FIG. 1 shows a flowchart of one embodiment disclosed herein for dissolving mineral scale.

In one aspect, embodiments disclosed herein relate to a method of dissolving mineral scale from oilfield equipment. In particular, embodiments disclosed herein relate to a method of dissolving scale in which the active chelating agent may be reclaimed for further use.

Mineral scale that may be effectively removed from oilfield equipment in embodiments disclosed herein includes oilfield scales, such as, for example, salts of alkaline earth metals or other divalent metals, including sulfates of barium, strontium, radium, and calcium, carbonates of calcium, magnesium, and iron, metal sulfides, iron oxide, and magnesium hydroxide.

A method of dissolving a mineral scale according to an embodiment disclosed herein is described in FIG. 1. As shown in FIG. 1, the scale may be initially removed from the oilfield equipment by exposing the scale to an aqueous solution that includes a chelating agent and a converting agent (step 100). As used herein, "chelating agent" is a chemical whose molecular structure can envelop and/or sequester a certain type of ion in a stable and soluble complex. Divalent cations form stable and soluble complex structures with several types of chelating chemicals. When held inside the complex, the cations have a limited ability to react with other ions, clays or polymers, for example. As used herein, "converting agent" is a chemical that may assist in the dissolution of the scale by converting an extremely insoluble salt to a more soluble salt. GB 2314865, which is herein incorporated by reference in its entirety, discloses the incorporation of a converting agent in a dissolving solution to increase the rate of dissolution of the scale.

By exposing the scale to the chelating agent, the chelating agent may cause the scale to dissolve by complexing with the alkaline earth metal of the scale salt (step 110). Once the chelating agent becomes saturated with the metal cations from the scale, the solution may be acidified to a pH of about 0-1 (step 120). As the pH is reduced, the availability of anions with which the sequestered cations may react may allow the cations to be released from the chelated complex to form an insoluble salt that will precipitate out of solution. The reduction of the pH to about 0-1 may also cause the chelating agent to precipitate out of solution in its acid form.

The precipitated chelating agent and alkaline earth metal salt may then be isolated from the remainder of the solution (step 130). Isolation of the precipitants may be performed by filtering the solids or decanting the solution off the solids, for example. Once isolated from the remainder of the first solution, the solids may be introduced into a fresh solution containing water and converting agent to selectively dissolve the precipitated chelating agent (step 140). Once the chelating agent has become selectively redissolved, the still-precipitated alkaline earth metal salt may be separated from the solution for disposal (step 150).

The pH of the solution may be raised to about 9-14, and the solution may be optionally reused to remove scale from another piece of equipment or additional scale from the same piece of equipment (step 160). By isolating the two precipitants and selectively dissolving the chelating agent in solution of fresh water and the converting agent, the recycled solution may consist essentially of water, the converting agent, and the chelating agent.

In one embodiment, the chelating agent that may be used in the solution to dissolve the metal scale may be a polydentate chelator so that multiple bonds with the metal ions may be formed in complexing with the metal. Polydentate chelators suitable for use in embodiments disclosed herein include, for example, ethylenediaminetetraacetic acid (EDTA), diethylenetriaminepentaacetic acid (DTPA), nitrilotriacetic acid (NTA), ethyleneglycoltetraacetic acid (EGTA), 1,2-bis(o-aminophenoxy)ethane-N,N,N',N'-tetraacetic acid (BAPTA), cyclohexanediaminetetraacetic acid (CDTA), triethylenetetraaminehexaacetic acid (TTHA), salts thereof, and mixtures thereof. However, this list is not intended to have any limitation on the chelating agents suitable for use in the embodiments disclosed herein. One of ordinary skill in the art would recognize that selection of the chelating agent may depend on the metal scale to be dissolved. In particular, the selection of the chelating agent may be related to the specificity of the chelating agent to the particular scaling cation, the logK value, the optimum pH for sequestering and the commercial availability of the chelating agent.

In a particular embodiment, the chelating agent used to dissolve metal scale is EDTA or salts thereof. Salts of EDTA may include, for example, alkali metal salts such as a tetrapotassium salt or tetrasodium salt. However, as the pH of the dissolving solution is altered in the processes disclosed herein, a dipotassium or disodium salt or the acid may be present in the solution.

In one embodiment, the converting agent may include any suitable chemical that can assist in the dissolution of the metal scale and formation of the chelating agent-metal complex. In a particular embodiment, the converting agent may include potassium carbonate. In other embodiments, the converting agent may include at least one of alkali metal carbonates, alkali metal bicarbonates, and ammonium chloride.

The acidification of the solution in precipitating the chelating agent out of solution may be achieved by the addition of a mineral or strong acid. In a particular embodiment, the acid may include at least one of hydrochloric acid, nitric acid, hydrobromic acid, hydroiodic acid, formic acid, hydrofluoric acid, sulfuric acid, and chloric acid. In another particular embodiment, hydrochloric acid is used to acidify the dissolving solution. In yet another particular embodiment, sulfuric acid may be used alone or in combination with at least hydrochloric acid to acidify the dissolving solution.

As the chelating agent is precipitated out of solution, the sequestered metal ions are released and may react with anions in the solution to form an insoluble salt which will also precipitate out of the dissolving solution. In one embodiment, a source of additional anions which will form an insoluble salt may be optionally added to the solution to ensure a sufficient quantity of available anions that will react with the released metal cations. In another embodiment, a source of sulfate ions may be optionally added to the solution.

In one embodiment, the precipitated insoluble salt may include at least one of barium sulfate, strontium sulfate, and radium sulfate. In another embodiment, an alkali metal sulfate is added to the solution to ensure adequate formation of the at least one of barium sulfate, strontium sulfate, and radium sulfate. The precipitants may be separated from the solution using techniques known by one ordinary skill in the art, such as, by filtration, decantation, and/or siphoning.

To selectively dissolve the precipitated chelating agent without dissolving the precipitated metal salt, the isolated precipitants are introduced to an aqueous solution in which the pH of the solution may be such that the chelating agent may dissolve yet have limited ability to re-chelate the barium sulfate. In one embodiment, the pH of the solution may be brought to a pH ranging from about 5 to about 7. In another embodiment, the pH of the solution may be brought to about 6. In a particular embodiment, the aqueous solution in which the chelating agent is selectively dissolved includes a converting agent. In another particular embodiment, the pH of the solution may be reached by the addition of an alkali metal hydroxide, carbonate, or bicarbonate.

In one embodiment, the fresh solution including the redissolved chelating agent may be reused for dissolving scale off of the same or another piece of equipment. The still-precipitated insoluble metal salt may be removed from the solution, such as by filtration, decantation, and/or siphoning. Prior to reuse of the solution and following removal of the insoluble metal salt, in one embodiment, the pH of the solution is raised to a pH in the range of 9-14. In another embodiment, the pH of the solution is raised to a pH in the range of 10-10.5. In yet another embodiment, the pH of the solution is raised by adding an additional amount of converting agent to the solution. In yet another embodiment, the pH of the solution is raised by adding an alkali hydroxide to the solution. One of ordinary skill in the art will recognize that the amount of converting agent to be added will depend upon the particular converting agent used and the desired pH of the solution.

In some embodiments disclosed herein, the dissolving solution may possess a dissolution capacity of at least 70 grams of scale per liter of dissolving solution. In other embodiments, the dissolving solution may possess a dissolution capacity of at least 80 grams of scale per liter of dissolving solution.

In one embodiment, high power ultrasound, low frequency sonic energy, or a low power ultrasound may be used in conjunction with the embodiments disclosed herein to increase the rate of dissolution of the scale by the solutions disclosed herein.

Exemplary Embodiment

In one embodiment, an aqueous solution that includes 10% by weight EDTA, 15% by weight potassium carbonate, and 75% by weight water is introduced to a piece of equipment having at least a portion of its surface covered by a barium sulfate mineral scale. After the aqueous solution has substantially dissolved the barium sulfate scale, the solution may be acidified with hydrochloric acid to a pH between 0 and 1. Upon isolation of the precipitated solids, a fresh solution of potassium carbonate may be added to the solids to achieve a final pH of about 6, whereby the dipotassium salt of EDTA will be formed and will be soluble at a level of about 10% by weight. After filtering the still-precipitated barium sulfate out of the solution, additional potassium carbonate may be added to the filtrate to bring the amount of potassium carbonate in the solution to about 15% by weight. The following equations illustrate the dissolution and subsequent isolation of a barium sulfate scale and regeneration of EDTA according to an embodiment disclosed herein:

$$EDTA\text{-}K_4 + K_2CO_3 + BaSO_4 \quad (1)$$

$$\downarrow$$

$$EDTA\text{-}K_4 + BaCO_3 + K_2SO_4 \quad (2)$$

$$\downarrow$$

$$EDTA\text{-}K_2Ba + K_2CO_3 + K_2SO_4 \quad (3)$$

$$\downarrow +2HCl$$

$$EDTA\text{-}K_2Ba + 2KCl + H_2O + CO_2 + K_2SO_4 \quad (4)$$

$$\downarrow +4HCl$$

$$EDTA\text{-}H_4(s) + BaSO_4(s) + 6KCl + H_2O \quad (6)$$

$$\downarrow Filter \rightarrow 6KCl + H_2O$$

$$EDTA\text{-}H_4(s) + BaSO_4(s) \quad (7)$$

$$\downarrow +K_2CO_3$$

$$EDTA\text{-}K_2H_2(aq) + BaSO_4(s) + H_2O + CO_2 \quad (8)$$

$$\downarrow Filter \rightarrow BaSO_4$$

$$EDTA\text{-}K_2H_2 + H_2O \quad (9)$$

$$\downarrow +K_2CO_3$$

$$EDTA\text{-}K_4 + 2H_2O + CO_2 \quad (10)$$

$$\downarrow +K_2CO_3$$

$$EDTA\text{-}K_4 + 2H_2O + K_2CO_3 \quad (11)$$

Equations (1)-(3) show the conversion of barium sulfate by potassium carbonate to barium carbonate and the subsequent chelation of barium by the tetrapotassium EDTA to form potassium sulfate as a by-product. In the acidification of the solution, shown in Eq. (4)-(6), hydrochloric acid initially reacts with the potassium carbonate to produce potassium chloride, water, and carbon dioxide gas. Once potassium carbonate has all reacted, further hydrochloric acid displaces the sequestered barium from the chelate and then replaces the two potassium ions associated with EDTA to form EDTA in its insoluble acid form which will precipitate out of solution in the pH range of 0-1. The displaced barium ions may form insoluble barium sulfate and precipitate out of solution. The precipitants may be isolated from the potassium chloride solution, as shown in Eq. (7). A solution of potassium carbonate may be added to the precipitants to selectively redissolve the EDTA as the dipotassium salt at a pH of about 6 and not dissolve the barium sulfate so that it may be removed from the solution, as shown in Eq. (8)-(9). As shown in Eq. (10)-(11), additional potassium carbonate may be added to convert the dipotassium salt of EDTA to the tetrapotassium salt and also to act as a converting agent so that the reaction cycle may be repeated upon introduction of additional barium sulfate scale.

Advantageously, embodiments disclosed herein may provide for a process by which mineral scale can be removed from oilfield equipment and the dissolving solution may be reclaimed without loss of performance. By precipitating the metal scale and the chelating agent as an insoluble acid, the inactive salts remaining in the dissolving solution may be removed from the system to avoid buildup of impurities in the dissolving solution which could otherwise lead to a reduction in the rate and/or efficiency of scale dissolution performance. If small quantities of chelating agent are lost in the process, small amounts may be added for subsequent reaction cycles so that recycling of the chelating agent and dissolving solution may be achieved without performance losses in dissolution rate or sequestering capacity in successive cycles. Contaminated equipment may be easily treated by soaking the item or a number of items in a volume of solution to dissolve scale encrusted thereon. Risk of exposure to decontamination operators may be minimal due to the chemical dissolution of the contaminated material without requiring operator contact.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of removing metal scale from surfaces, comprising:
    contacting the surfaces with a first aqueous solution comprising:
        a chelating agent;
    allowing the chelating agent to dissolve the metal scale from the surfaces into the first aqueous solution;
    acidifying the first aqueous solution to form a precipitate of the chelating agent and a precipitate of the metal from the metal scale in the first aqueous solution, wherein both the precipitate of the chelating agent and the precipitate of the metal are present together in the first aqueous solution;
    isolating the precipitate of the chelating agent and the precipitate of the metal from the first aqueous solution and introducing the precipitate of the chelating agent and the precipitate of the metal into a second aqueous solution;
    selectively dissolving the precipitate of the chelating agent in the second aqueous solution; and
    removing the precipitate of the metal from the second aqueous solution.

2. The method of claim 1, wherein the first aqueous solution further comprises:
    a converting agent.

3. The method of claim 1, wherein selectively dissolving comprises raising the pH of the second aqueous solution to about 5-7 to form a soluble salt of the chelating agent.

4. The method of claim 1, further comprising:
    raising the pH of the second aqueous solution to about 9-14.

5. The method of claim 1, wherein the second aqueous solution consists essentially of water, a converting agent, and the chelating agent.

6. The method of claim 1, wherein the selectively dissolving comprises adding a solution of potassium carbonate to the isolated precipitant of the chelating agent and precipitant of the metal from the first aqueous solution.

7. The method of claim 1, wherein the acidifying comprises adding hydrochloric acid to the first aqueous solution.

8. The method of claim 1, wherein the acidifying comprises acidifying the first aqueous solution to a pH of less than about 1.

9. The method of claim 1, wherein the metal scale comprises at least one of barium sulfate, strontium sulfate, and radium sulfate.

10. The method of claim 1, further comprising:
    providing a source of anions which forms a precipitate of an insoluble salt of the metal of the dissolved metal scale to the first aqueous solution.

11. The method of claim 2, wherein the chelating agent comprises at least one of EDTA, DTPA, and NTA; and wherein the converting agent comprises a carbonate salt.

12. The method of claim 4, further comprising:
    contacting a surface having scale thereon with the second aqueous solution.

13. A method of removing scale from surfaces, comprising:
    contacting the surfaces with a first aqueous solution comprising:
        EDTA; and
        potassium carbonate;
    allowing the EDTA to dissolve the scale from the surfaces into the first aqueous solution, wherein the scale comprise at least one of barium sulfate, strontium sulfate, and radium sulfate;
    acidifying the first aqueous solution to form a precipitate of EDTA and precipitant of an insoluble salt of at least one of barium, strontium, and radium in the first aqueous solution, wherein both the precipitate of EDTA and the precipitate of the insoluble salt are present together in the first aqueous solution;
    isolating the precipitate of EDTA and the precipitate of the insoluble salt of the at least one of barium, strontium, and radium from the first aqueous solution and introducing the precipitate of EDTA and the precipitate of the insoluble salt into a second aqueous solution;
    selectively dissolving the precipitate of EDTA in the second aqueous solution; and
    removing the precipitate of the insoluble salt of at least one of barium, strontium, and radium from the second aqueous solution.

14. The method of claim 13, wherein the acidifying comprises adding hydrochloric acid to the first aqueous solution.

15. The method of claim 13, wherein the acidifying comprises acidifying the first aqueous solution to a pH of less than about 1.

16. The method of claim 13, further comprising:
    providing a source of sulfate ions to the first aqueous solution.

17. The method of claim 13, wherein selectively dissolving comprises raising the pH of the second aqueous solution to about 5-7 to form a soluble salt of EDTA.

18. The method of claim 13, further comprising:
    raising the pH of the second aqueous solution of the selectively dissolved EDTA to about 9-14.

19. The method of claim 13, wherein the second aqueous solution consists essentially of water, potassium carbonate, and EDTA.

20. The method of claim 13, wherein the selectively dissolving comprises adding a solution of potassium carbonate to the isolated precipitant of EDTA and the precipitant of the insoluble salt from the first aqueous solution.

21. The method of claim 18, further comprising:
contacting a surface having scale thereon with the second aqueous solution.

* * * * *